United States Patent [19]
Kurple

[11] Patent Number: 6,054,562
[45] Date of Patent: Apr. 25, 2000

[54] MODIFIED LIGNINS

[76] Inventor: Kenneth R. Kurple, 9533 Springborn Rd., Anchorville, Mich. 48004

[21] Appl. No.: 09/257,453

[22] Filed: Feb. 25, 1999

[51] Int. Cl.⁷ .............................. C07G 1/00; C08F 16/06
[52] U.S. Cl. ...................... 530/504; 568/579; 568/613; 524/73; 524/539; 524/735; 524/765; 528/422; 528/425; 525/54.42; 525/437; 527/604; 530/502; 530/505; 530/507
[58] Field of Search ................................. 568/579, 613; 524/73, 539, 735, 765; 528/422, 425; 525/54.42, 437; 527/604; 530/502, 504, 505, 507

[56] References Cited

U.S. PATENT DOCUMENTS

| | | | |
|---|---|---|---|
| 4,329,437 | 5/1982 | Blount | 521/100 |
| 4,376,171 | 3/1983 | Blount | 521/100 |
| 4,918,167 | 4/1990 | Glasser et al. | 530/502 |
| 5,102,992 | 4/1992 | Glasser et al. | 530/502 |

*Primary Examiner*—Samuel A. Acquah
*Attorney, Agent, or Firm*—Woodling, Krost and Rust

[57] ABSTRACT

Lignin and polyether glycol produces a product which has a distinct melt point and melt viscosity. Polyether glycol has a plasticizing effect wherein the lignin can be thought of as the hard resin. When 20 parts of polyether glycol are processed with 80 parts of lignin a new material which has a melt point and a viscosity is created whereas lignin itself has no melt and flow characteristics. The new modified lignin can be cured with hexamine like a phenolic resin.

11 Claims, No Drawings

MODIFIED LIGNINS

This application claims priority of PCT Application No. PCT/US97/15039 which claims a priority date of Aug. 26, 1996.

There are substantial markets available to lignins if they can achieve the same melt and flow characteristics as a phenolic resin. Phenolic resins are used to make plastics.

The present invention allows lignin which has been modified to totally replace phenolic resins. First, lignin which does not have any distinct melt point or flow characteristics can be modified with a certain amount of polyether glycol to achieve a certain desired melt point. So, what occurs is a certain ratio of lignin to a polyether compound (such as polyether glycol) produces a product which has a distinct melt point and melt viscosity. This effect can be thought of as a type of plasticizing effect wherein the lignin can be thought of as the hard resin. For example, when 20 parts of a polyether glycol is properly processed with 80 parts of lignin what results is a new material which now has melt and flow characteristics, whereas lignin by itself has no melt and flow characteristics.

Second, because these melt and flow characteristics are similar to a phenolic resin these new modified lignins can be cured with hexamine just like a phenolic resin. Hexamine is a trade name for hexamethylene-tetramine. This is because the lignin molecule contains phenolic groups which are reactive to hexamine just as in a phenolic resin. Lignin does contain phenolic groups that are reactive to hexamine because without mixing it with a polyether compound, the lignin molecule does not melt and flow. Without the melt and flow characteristics, it is difficult to obtain a commercially moldable part from a press with heat and pressure.

Another major advantage of this present invention is that lignin is derived from wood, which is a natural product. As in all natural products there will exist a certain amount of variation depending on the exact type of wood, age and other conditions. These variations are another major reason why lignins have not been extensively utilized as replacements for phenolic resins, whereas a synthetic phenolic resin can be made to exact and reproducible specifications, and the lignin molecule may have wide variations. Therefore, if there is a variation in the lignin this can be adjusted by changing the ratio of lignin to a polyether compound (such as polyether glycol) in order to achieve the desired melt and flow characteristics.

Another important aspect of this invention that has a synergistic effect on the melt and flow characteristics is the sodium level of the lignin. It was discovered that if the sodium level is too high the modified lignin will not have melt and flow characteristics which can be utilized as a commercial product. It was found that the same lignin, but with different sodium levels, will produce modified lignins with wide variations in melt and flow characteristics. Therefore, it was discovered that there is a certain critical level for the presence of sodium and other ionic materials above which no useful products could be obtained. This critical level may vary depending on the specific nature or chemical composition of the lignin. Experimentation has determined that this sodium level of the lignin is less than 22% by weight of sodium.

Another major invention is the fact that lignins are a natural product and as such there may be natural chemical variations in the lignin molecule. These variations may include different functional groups or different concentrations of these functional groups. These variations become rather significant when you are trying to formulate a product that must have, in addition to certain physical properties such as melt and flow, certain curing characteristics in order to produce a consistent product day in and day out.

These curing characteristics are very important because in addition to the physical properties of the product they also determine the productivity, which directly affects how profitable the product will be. One major market for lignins is to either partially or totally replace phenolic resins in many products that currently use all phenolic resins. There are at least two major advantages why lignins can be used as either partial or total replacement of phenolic resins in phenolic production. One major advantage is that lignins can offer significant economic advantages. Since most phenolic resins are made from phenol and phenol is a petrochemical product, cost of phenol is very dependent on the cost of oil. So, as the cost of oil increases, the cost of phenol and phenolic resins will also increase. These price increases could make phenolic resins less competitive and thereby make it possible for these phenolic products to be replaced by other products. Therefore, when more lignin can be incorporated into a phenolic product, this could offset price increases and make these lignin modified phenolic products more profitable and more competitive, thus increasing their market shire.

The polyether glycol could be ethylene glycol, propylene glycol, or polyether compound which is made primarily from propylene oxide. Also the polyether compound could also be made from the reaction of propylene oxide or ethylene oxide with alcohols, amines, nonylphenol, phenol, or any phenolic compound. Such products that were used in this invention are Surfonic-60 a nonylphenol ethoxylate, Surfonic L-8 an alcohol ethoxylate, and WL-440 which is a reaction product of propylene oxide and ethylene oxide, all products of the former Texaco Chemical Company, now Huntsman Chemical Company. Terate 2031 is a polyester resin product of Hoechst-Celanese. Stephanol 2352 is a polyester resin of the Stephan Chemical Company.

EXAMPLE 1

In a suitable vessel 20 parts of Pluracol P-410 are heated to 200° F. and 80 parts of lignin are slowly added while adequate agitation is maintained and the temperature is slowly increased to 270° F. Pluracol P-410 is a registered trademark of BASF and it is the reaction product of propylene oxide initiated )y glycol. Pluracol P-410 is a polyether polyol. The viscosity of this mixture will increase significantly but it still is able to be mixed. Then once all of the lignin is added, the mixture is continued to be mixed until everything is homogeneous. Then this mixture is poured out on to a surface which allows this mixture to cool and form a hard brittle material. This lignin is now in a form which is very similar to phenolic resins. This modification of the lignin now makes it possible for it to have melt and flow characteristics. Hexamine is then reacted with the hard lignin resin.

EXAMPLE 2

In a suitable vessel 20 parts of Terate 2031 are heated to 200° F. and 80 parts of lignin are slowly added while adequate agitation is maintained and the temperature is slowly increased to 270° F. The viscosity of this mixture will increase significantly but it still is able to be mixed. Then once all of the lignin is added, the mixture is continued to be mixed until everything is homogeneous. Then this mixture is poured out on to a surface which allows this mixture to cool and form a hard brittle material. This lignin is now in a form which is very similar to phenolic resins. This modification of the lignin now makes it possible for it to have melt and flow characteristics. Terate 2031 is a registered trademark of Hoechst Celanese and it is a polyester. Hexamine is then reacted with the hard lignin resin.

EXAMPLE 3

In a suitable vessel 10 parts of Pluracol P-975 and 10 parts Terate 2031 are heated to 200° F. and 80 parts of lignin are slowly added while adequate agitation is maintained and the temperature is slowly increased to 270° F. The viscosity of this mixture will increase significantly but it still is able to be mixed. Then once all of the lignin is added, the mixture is continued to be mixed until everything is homogeneous. Then this mixture is poured out on to a surface which allows this mixture to cool and form a hard brittle material. This lignin is now in a form which is very similar to phenolic resins. This modification of the lignin now makes it possible for it to have melt and flow characteristics. Pluracol P-975 is a polyether glycol and Terate 2031 is a polyester. Hexamine is then reacted with the hard lignin resin.

EXAMPLE 4

In a suitable vessel 20 parts of Stephanol 2352 are heated to 200° F. and 80 parts of lignin are slowly added while adequate agitation is maintained and the temperature is slowly increased to 270° F. The viscosity of this mixture will increase significantly but still is able to be mixed. Then once all of the lignin is added, the mixture is continued to be mixed until everything is homogeneous. Then this mixture is poured out on to a surface which allows this mixture to cool and form a hard brittle material. This lignin is now in a form which is very similar to phenolic resins. This modification of the lignin is now in a form which is very similar to phenolic resins. This modification of the lignin now makes it possible for it to have melt and flow characteristics. Hexamine is then reacted with the hard lignin resin.

EXAMPLE 5

In a suitable vessel 10 parts of Pluracol P-975 and 10 parts of Stephanol 2352 are heated to 200° F. and 80 parts of lignin are slowly added while adequate agitation is maintained and the temperature is slowly increased to 270° F. The viscosity of this mixture will increase significantly but still is able to be mixed. Then once all of the lignin is added, the mixture is continued to be mixed until everything is homogeneous. Then this mixture is poured out on to a surface which allows this mixture to cool and form a hard brittle material. This lignin is now in a form which is very similar to phenolic resins. This modification of the lignin now makes it possible for it to have melt and flow characteristics. Hexamine is then reacted with the hard lignin resin.

EXAMPLE 6

In a suitable vessel 20 parts of Surfonic-60 are heated to 200° F. and 80 parts of lignin are slowly added while adequate agitation is maintained and the temperature is slowly increased to 270° F. The viscosity of this mixture will increase significantly but it still is able to be mixed. Then once all of the lignin is added, the mixture is continued to be mixed until everything is homogeneous. Then this mixture is poured out on to a surface which allows this mixture to cool and form a hard brittle material. This lignin is now in a form which is very similar to phenolic resins. This modification of the lignin now makes it possible for it to have melt and flow characteristics. Hexamine is then reacted with the hard lignin resin.

EXAMPLE 7

In a suitable vessel 10 parts of Pluracol P-975 and 10 parts of Surfonic-60 are heated to 200° F. and 80 parts of lignin are slowly added while adequate agitation is maintained and the temperature is slowly increased to 270° F. The viscosity of this mixture will increase significantly but it still is able to be mixed. Then once all of the lignin is added, the mixture is continued to be mixed until everything is homogeneous. Then this mixture is poured out on to a surface which allows this mixture to cool and form a hard brittle material. This lignin is now in a form which is very similar to phenolic resins. This modification of the lignin now makes it possible for it to have melt and flow characteristics. Hexamine is then reacted with the hard lignin resin.

EXAMPLE 8

In a suitable vessel 20 parts of WL-440 are heated to 200° F. and 80 parts of lignin are slowly added while adequate agitation is maintained and the temperature is slowly increased to 270° F. The viscosity of this mixture will increase significantly but it still is able to be mixed. Then once all of the lignin is added the mixture is continued to be mixed until everything is homogeneous. Then this mixture is poured out on to a surface which allows this mixture to cool and form a hard brittle material. This lignin is now in a form which is very similar to phenolic resins. This modification of the lignin now makes it possible for it to have melt and flow characteristics. Hexamine is then reacted with the hard lignin resin.

EXAMPLE 9

In a suitable vessel 10 parts of Terate 2031 and 10 parts of WL-440 are heated to 200° F. and 80 parts of lignin are slowly added while adequate agitation is maintained and the temperature is slowly increased to 270° F. The viscosity of this mixture will increase significantly but it still is able to be mixed. Then once all of the lignin is added, the mixture is continued to be mixed until everything is homogeneous. Then this mixture is poured out on to a surface which allows this mixture to cool and form a hard brittle material. The lignin is now in a form which is very similar to phenolic resins. This modification of the lignin now makes it possible for it to have melt and flow characteristics. Hexamine is then reacted with the hard lignin resin.

EXAMPLE 10

In a suitable vessel 20 parts of Surfonic L12-8 are heated to 200° F. and 80 parts of lignin are slowly added while adequate agitation is maintained and the temperature is slowly increased to 270° F. The viscosity of this mixture will increase significantly but it still is able to be mixed. Then once all of the lignin is added, the mixture is continued to be mixed until everything is homogeneous. Then this mixture is poured out on to a surface which allows this mixture to cool and form a hard brittle surface. This lignin is now in a form which is very similar to phenolic resins. This modification of the lignin now makes it possible for it to have melt and flow characteristics. Hexamine is then reacted with the hard lignin resin.

EXAMPLE 11

In a suitable vessel 10 parts of Pluracol P-975 and 10 parts of Surfonic L12-8 are heated to 200° F. and 80 parts of lignin are slowly added while adequate agitation is maintained and the temperature is slowly increased to 270° F. The viscosity of this mixture will increase significantly but it still is able to be mixed. Then once all of the lignin is added, the mixture is continued to be mixed until everything is homogeneous. Then this mixture is poured out on to a surface which allows this mixture to cool and form a hard brittle material. The lignin is now in a form which is very similar to phenolic resins. This modification of the lignin now makes it possible for it to have melt and flow characteristics. Hexamine is then reacted with the hard lignin resin.

What is claimed is:

1. A composition comprising lignin blended with a polyether compound to improve the melt and flow characteristics of the lignin, said lignin having a sodium level less than 22% by weight of sodium.

2. A composition as claimed in claim 1 wherein the percentage of said polyether compound is from 1% to 70% of the composition.

3. A composition comprising lignin blended with a polyester compound to improve the melt and flow characteristics of the lignin, said lignin having a sodium level less than 22% by weight of sodium.

4. A composition as claimed in claim 3 wherein the percentage of said polyester compound is from 1% to 70% of the composition.

5. A composition as claimed in claim 1 wherein said polyether compound is produced by the reaction product of ethylene oxide and propylene oxide.

6. A composition comprising lignin and blended with a combination of polyester resins and polyether glycols to improve the melt and flow characteristics of the lignin, said lignin having a sodium level less than 22% by weight of sodium.

7. A composition comprising a polyether derivative (reaction product of ethylene oxide and propylene oxide) which is initiated by a chemical selected from the group consisting of nonylphenol, phenol and a substituted phenol blended with lignin to improve the melt and flow characteristics of lignin, said lignin having a sodium level less than 22% by weight of sodium.

8. A composition as claimed in claim 1 wherein the modified lignin is reacted with hexamine to produce a cured product.

9. A composition as claimed in claim 3 wherein the modified lignin is reacted with hexamine to produce a cured product.

10. A composition as claimed in claim 6 wherein the modified lignin is reacted with hexamine to produce a cured product.

11. A composition as claimed in claim 7 wherein the modified lignin is reacted with hexamine to produce a cured product.

* * * * *